F. E. SAUERWEIN, R. ZACHARIAS & C. E. LEWIS.
DETACHABLE LEAF PROGRAM HOLDER.
APPLICATION FILED SEPT. 3, 1909.
942,670.
Patented Dec. 7, 1909.
2 SHEETS—SHEET 1.
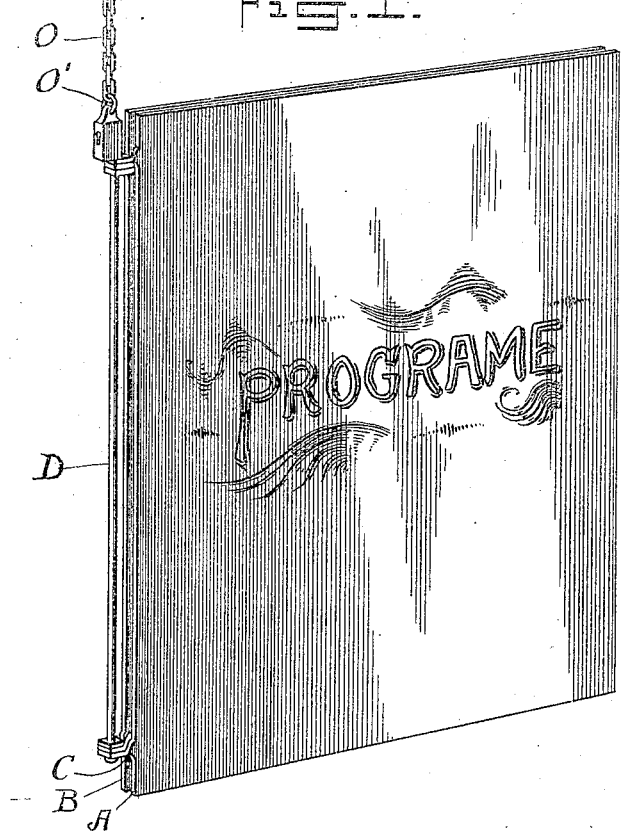
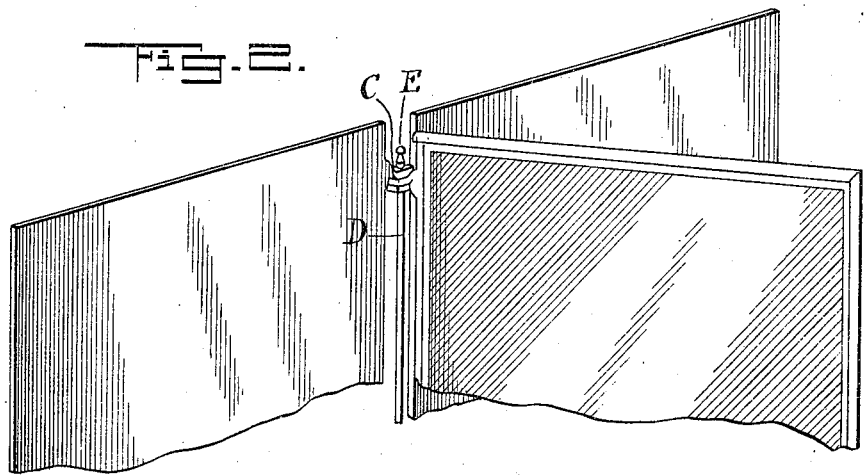

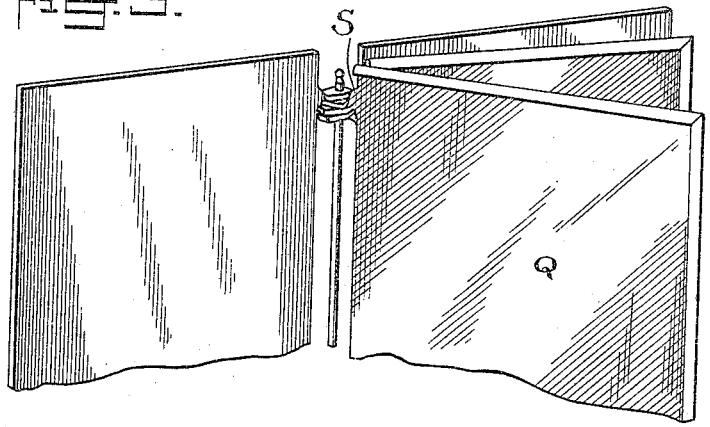
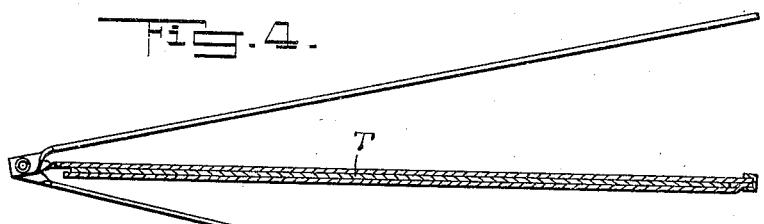
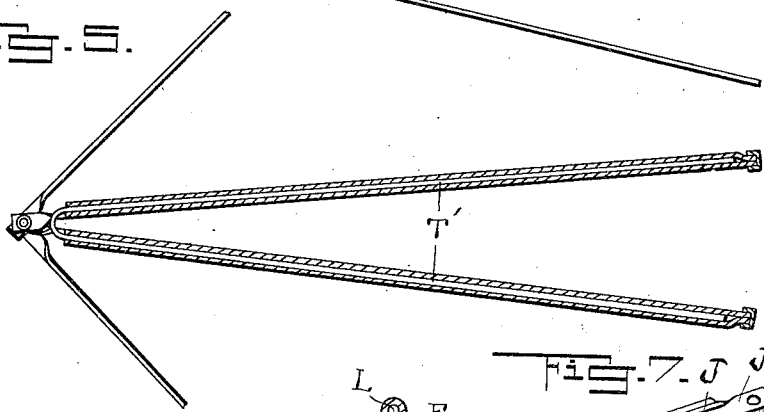
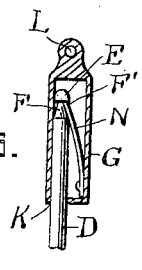
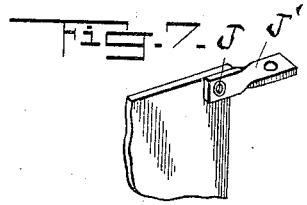

UNITED STATES PATENT OFFICE.

FRANK E. SAUERWEIN, ROBERT ZACHARIAS, AND CHARLES E. LEWIS, OF BALTIMORE, MARYLAND, ASSIGNORS TO THE LEWIS COMPANY, OF BALTIMORE, MARYLAND, A CORPORATION OF MARYLAND.

DETACHABLE-LEAF PROGRAM-HOLDER.

942,670.  Specification of Letters Patent.  Patented Dec. 7, 1909.

Application filed September 3, 1909. Serial No. 516,080.

*To all whom it may concern:*

Be it known that we, FRANK E. SAUERWEIN, ROBERT ZACHARIAS, and CHARLES E. LEWIS, citizens of the United States, residing at Baltimore city, in the State of Maryland, have invented certain new and useful Improvements in Detachable-Leaf Program-Holders; and we do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in detachable leaves and locking devices for holding programs in theaters and other places of assembly, and comprises various details of construction which will be hereinafter fully described and then specifically defined in the appended claims.

We illustrate our invention in the accompanying drawings, in which:—
Figure 1 is a perspective view showing a program holding and locking device embodying the features of our invention, the device being shown as closed. Fig. 2 is a perspective view showing the covers opened and the lock removed. Fig. 3 is a detail perspective view showing the manner of fastening the detachable leaves. Fig. 4 is a cross sectional view through the device. Fig. 5 is an end view. Fig. 6 is a detail sectional view through the locking device, and Fig. 7 is a detail view of a portion of the invention.

Reference now being had to the details of the drawings by letter, A and B designate the two covers of the program holding device, which covers are made of any suitable material such as aluminum, and each is provided with an integral lug C projecting from its inner edge and bent so as to have a flat portion at right angles to the plane of the cover, as shown clearly in the drawings. Each of said lugs, there being a plurality upon each cover, is provided with an aperture, which apertures are in registration.
D designates a hinged rod passing through said registering apertures of the two covers, and one end, designated by letter E, of said rod, is preferably rounded and has an annular groove F formed adjacent to said end, said groove terminating at its outer end in a shoulder F′.

G designates a casing made preferably of sheet metal, which is hollow, and provided with an opening K in its lower end of sufficient size to receive the hinged rod D. Fixed to or integral with the wall of said casing is a resilient finger N, the upper free end of which is so positioned that when the rod D is inserted within the casing a sufficient distance, it will engage the shoulder F′ underneath the head F and serve as a means of holding the rod locked to the casing. Said casing is provided with a suitable key-hole through which a key may be inserted for the purpose of retracting the resilient finger from engagement with the head of the rod when it may be desired to unlock the rod for the purpose of removing or replacing the covers or leaves.

A chain, designated by letter O, is attached to a ring O′, which in turn is secured to an eye L in said casing, said chain forming means whereby the device may be fixed to the back of a seat or other object. A series of leaves, designated by letter Q and made of any suitable material upon which the printing of a program, advertisements, etc., may appear, has lugs S, either integral with or fastened thereto in any suitable manner, and which lugs are provided with apertures adapted to be brought into registration with the apertures in the lugs upon the cover, so that the hinged rods may pass through all of the lugs with registering apertures. If preferred, the leaves Q may be each formed with a pocket, as shown in the drawings, and in which event, the walls of the pocket are made preferably of a transparent material, whereby the printing upon the program inserted within the pocket may be visible through the walls of said pocket.

In Fig. 4 of the drawings, we have shown a leaf having a single pocket with a program T therein, and in Fig. 5 of the drawings, two leaves each having a pocket are shown in which a single program, designated by letter T′, is held, one-half of the program being mounted in each pocket and affording means whereby the program may be securely held in place, the printing upon both sides of the program being visible through either face of the wall of the pocket.

In Fig. 7 of the drawings, we have shown an eyelet J which is adapted to be clenched to a detachable leaflet, each eyelet being provided with a wing J' which is apertured. This modified means may be employed for holding the leaflet when the same is made of a frail material such as paper.

What we claim to be new, is:—

1. A program holding device comprising covers having lugs projecting therefrom at right angles to the plane of the cover and apertured, detachable leaves having lugs at right angles to the plane thereof and apertured, a hinged rod passing through registering apertures in said covers and leaves, and means for locking the same together, as set forth.

2. A program holding device comprising covers having lugs projecting therefrom at right angles to the plane of the cover and apertured, detachable leaves having lugs at right angles to the plane thereof and apertured, a hinged rod passing through registering apertures in said covers and leaves, and a lock engaging said rod and adapted to hold the leaves hinged together, as set forth.

3. A program holding device comprising covers having lugs projecting therefrom at right angles to the plane of the cover and apertured, detachable leaves having lugs at right angles to the plane thereof and apertured, a hinged rod passing through registering apertures in said covers and leaves, the upper end of the rod having an annular groove terminating in a shoulder, a casing in which the grooved end of said rod is adapted to engage, and means within the casing for engagement with said shoulder to lock the rod within the casing, as set forth.

4. A program holding device comprising covers having lugs projecting therefrom at right angles to the plane of the cover and apertured, detachable leaves having lugs at right angles to the plane thereof and apertured, a hinged rod passing through registering apertures in said covers and leaves, the upper end of the rod having an annular groove terminating in a shoulder, a casing in which the grooved end of said rod is adapted to engage, and a resilient finger within said casing adapted to spring into said groove and engage the shoulder to hold the rod within the casing, as set forth.

In testimony whereof we hereunto affix our signatures in the presence of two witnesses.

FRANK E. SAUERWEIN.
ROBERT ZACHARIAS.
CHARLES E. LEWIS.

Witnesses:
 JOHN W. HEWES,
 M. E. WELLENER.